Dec. 31, 1957  R. McK. BROWNING ET AL  2,818,003
APPARATUS FOR MAKING A MULTI-PLY VALVE BAG HAVING
AN EXTENDED INTERMEDIATE VALVE PLY
Filed Sept. 3, 1953   8 Sheets-Sheet 1
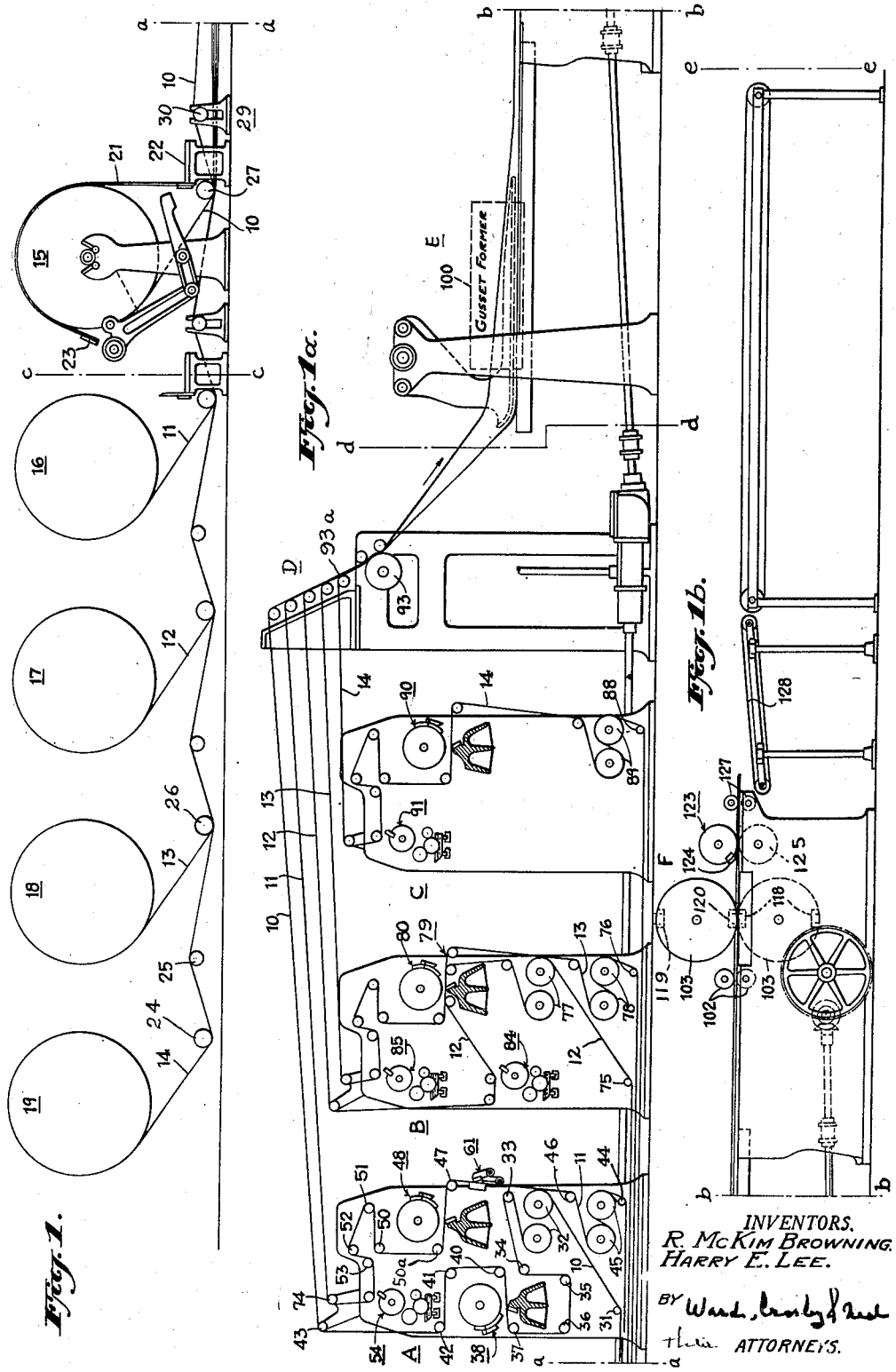
INVENTORS.
R. McKIM BROWNING.
HARRY E. LEE.
BY Ward, Crosby & Neal
their ATTORNEYS.

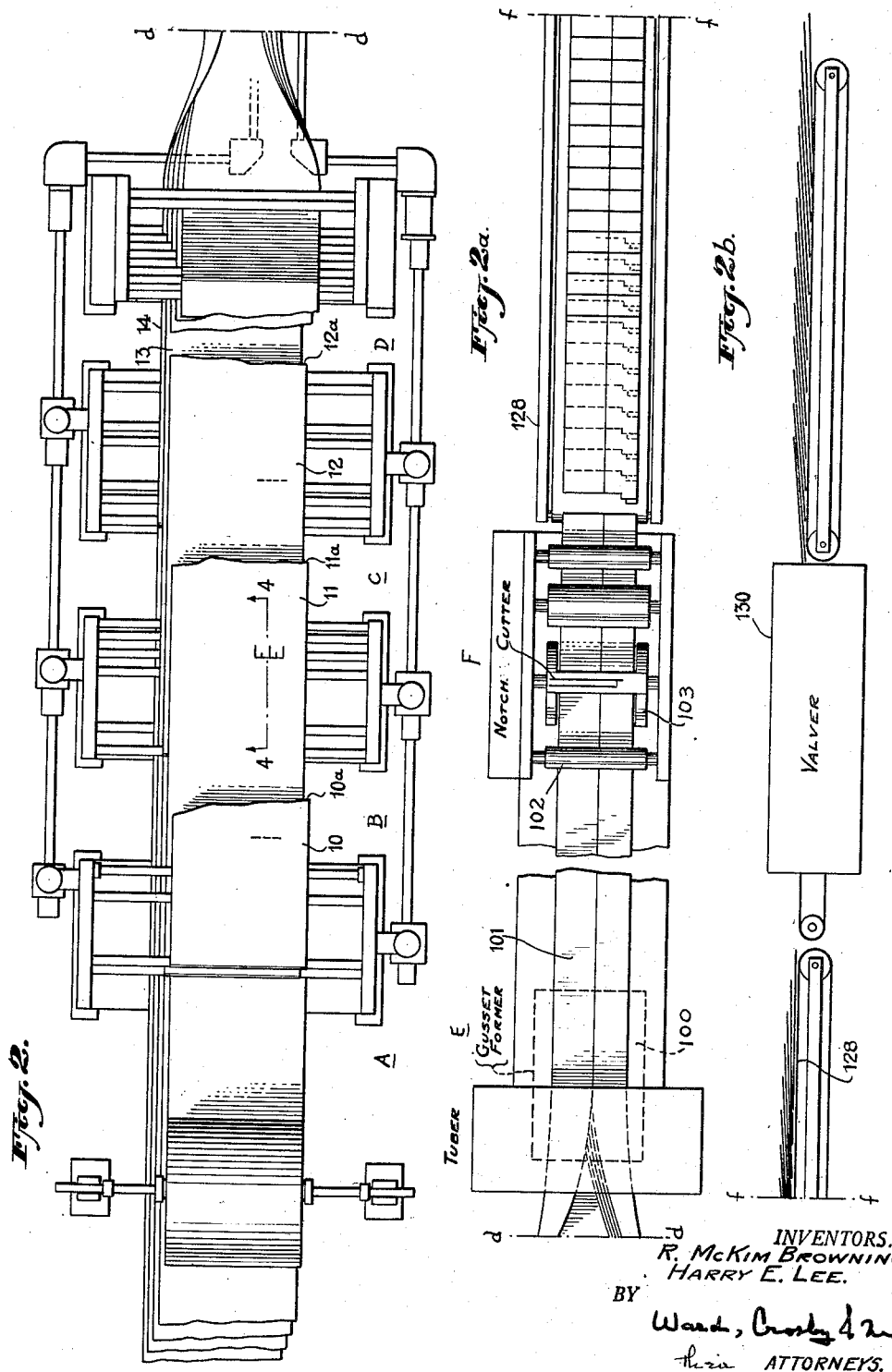

Dec. 31, 1957   R. McK. BROWNING ET AL   2,818,003
APPARATUS FOR MAKING A MULTI-PLY VALVE BAG HAVING
AN EXTENDED INTERMEDIATE VALVE PLY
Filed Sept. 3, 1953   8 Sheets-Sheet 3
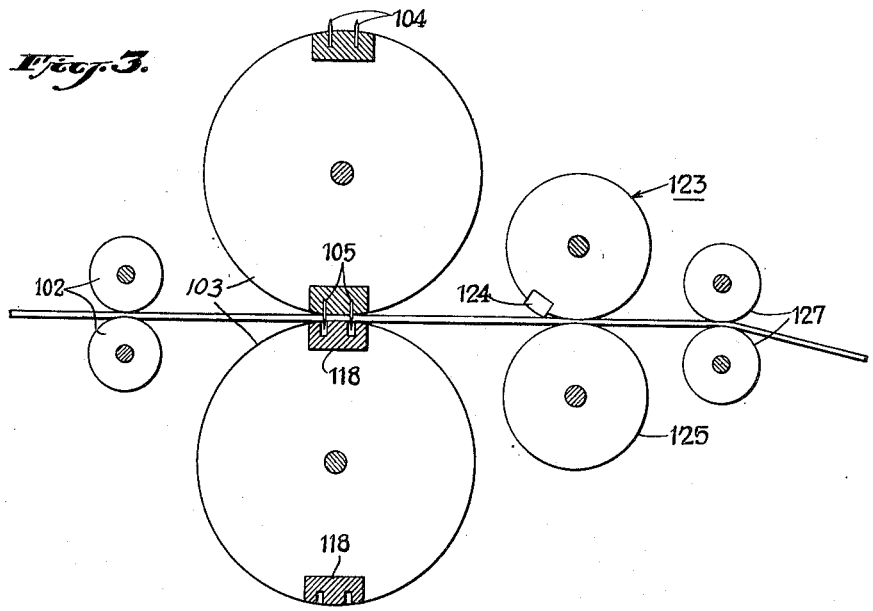
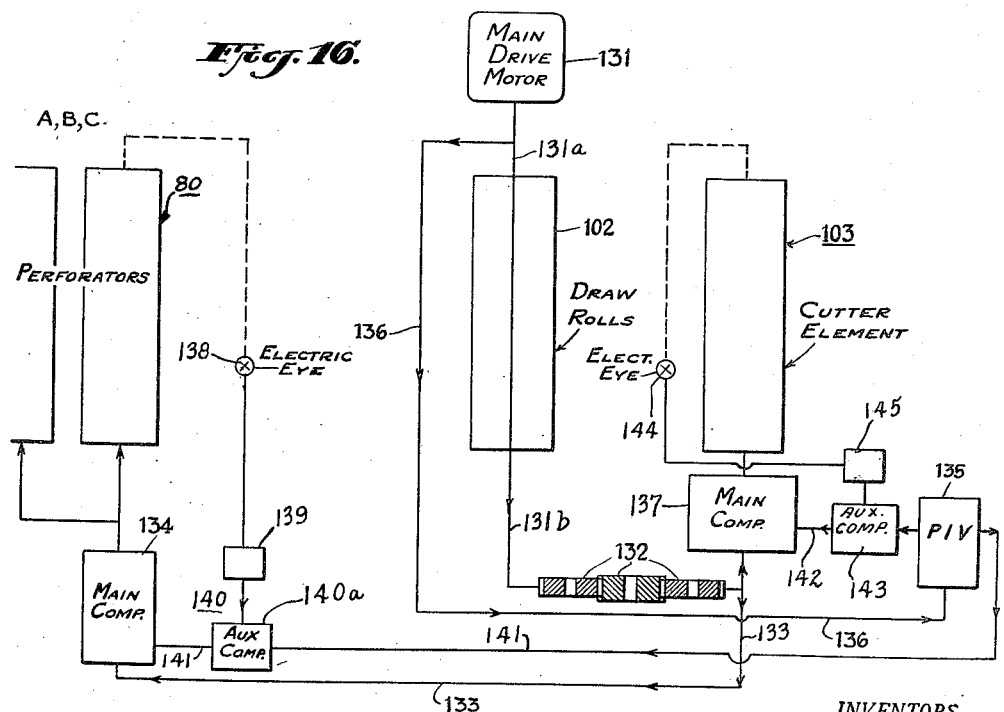
INVENTORS.
R. McKIM BROWNING.
HARRY E. LEE.
BY
their ATTORNEYS.

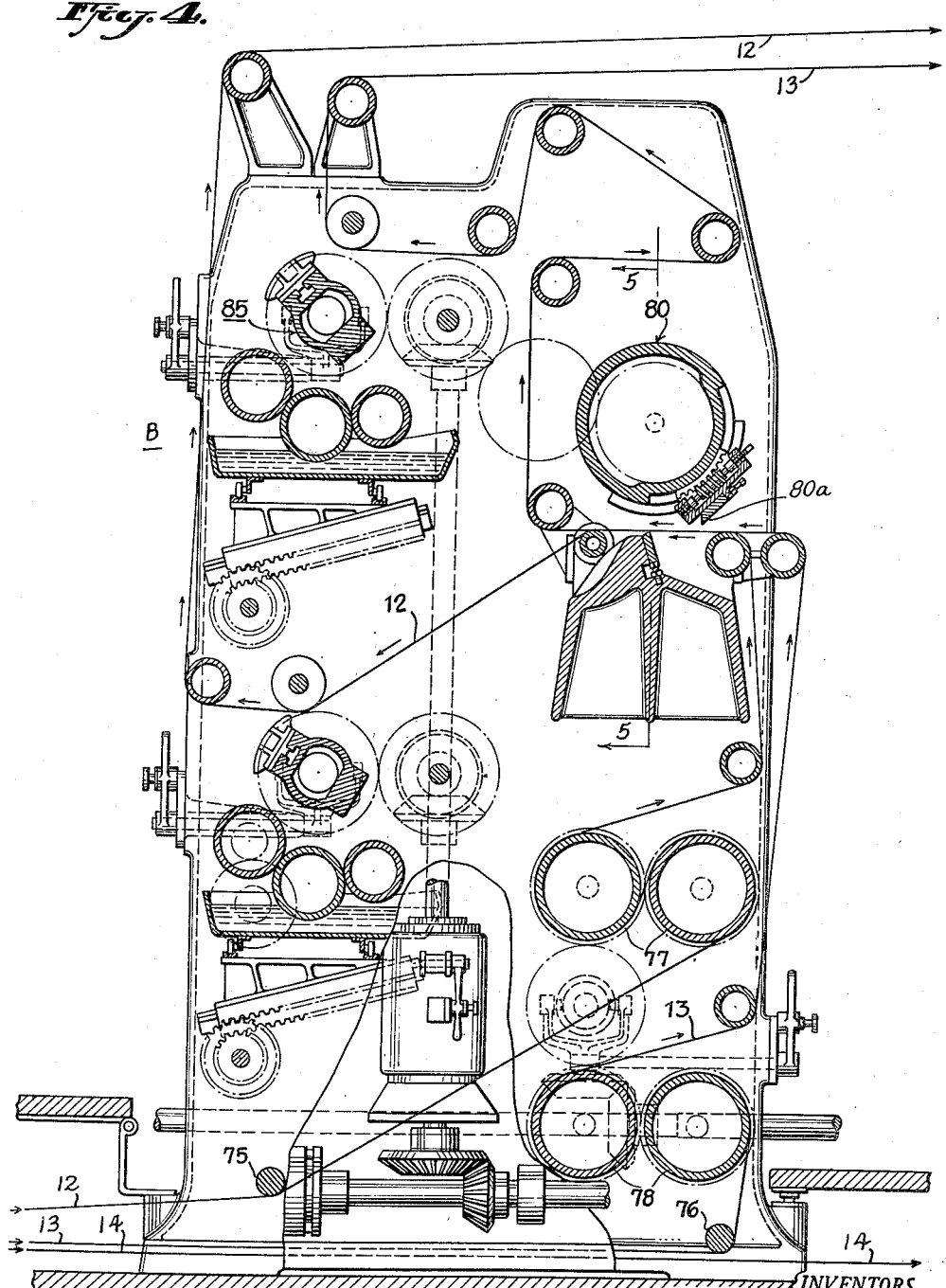

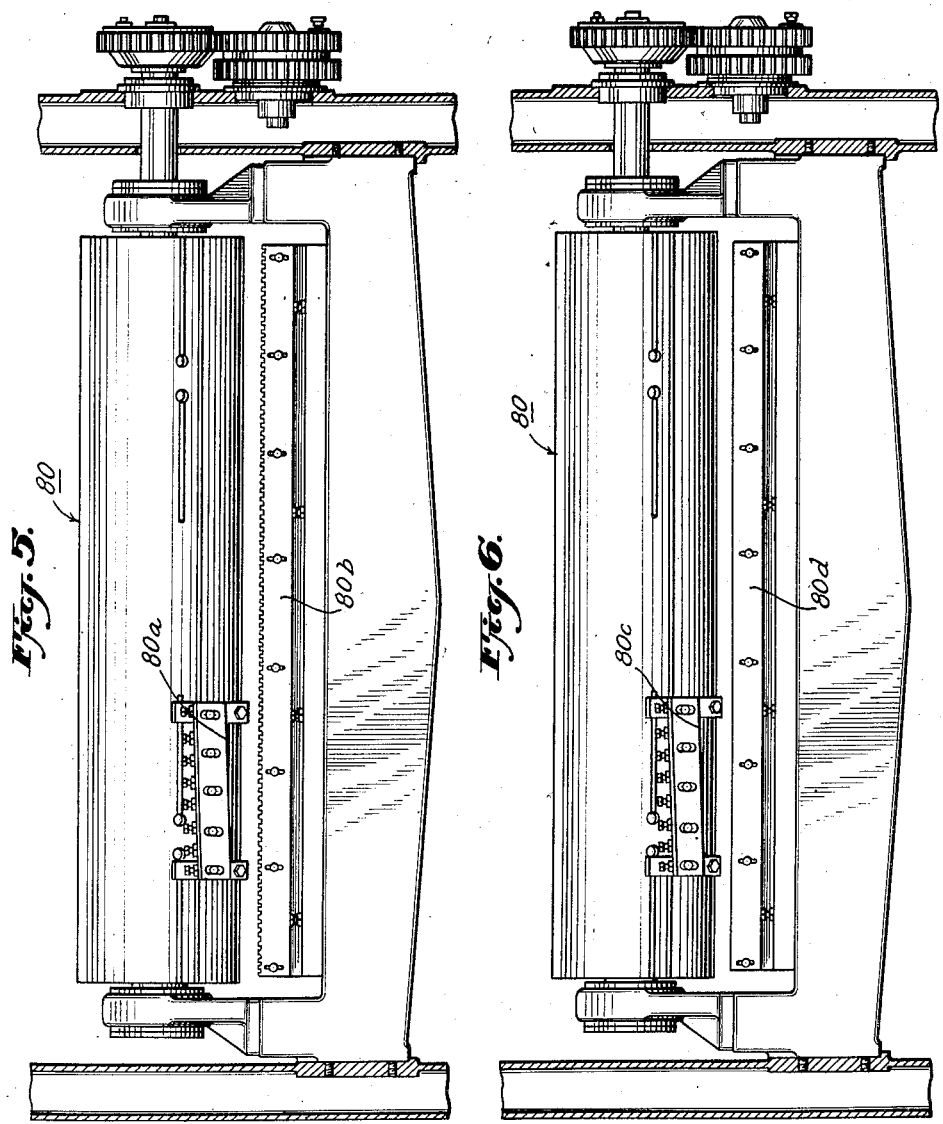

Dec. 31, 1957   R. McK. BROWNING ET AL   2,818,003
APPARATUS FOR MAKING A MULTI-PLY VALVE BAG HAVING
AN EXTENDED INTERMEDIATE VALVE PLY
Filed Sept. 3, 1953                                   8 Sheets-Sheet 6
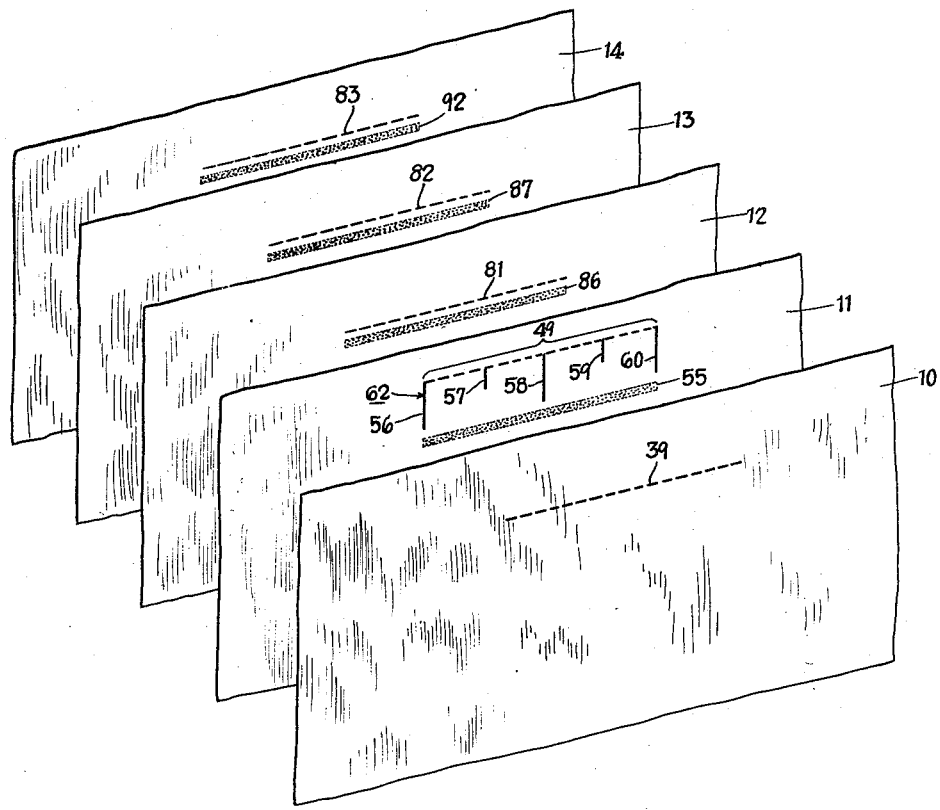
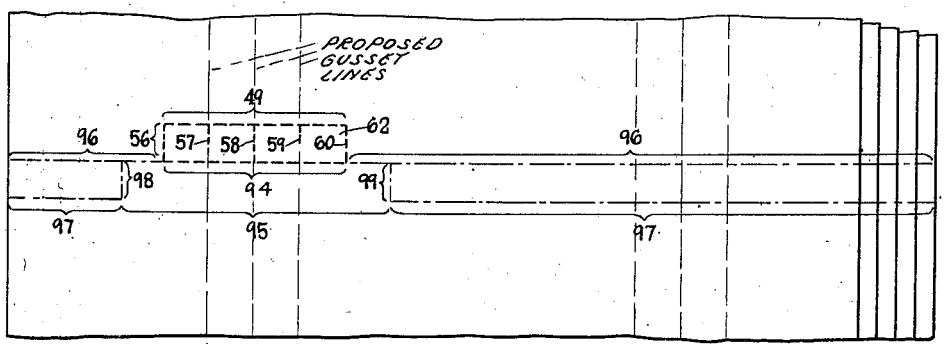
INVENTORS.
R. McKIM BROWNING.
HARRY E. LEE.
BY
their ATTORNEYS.

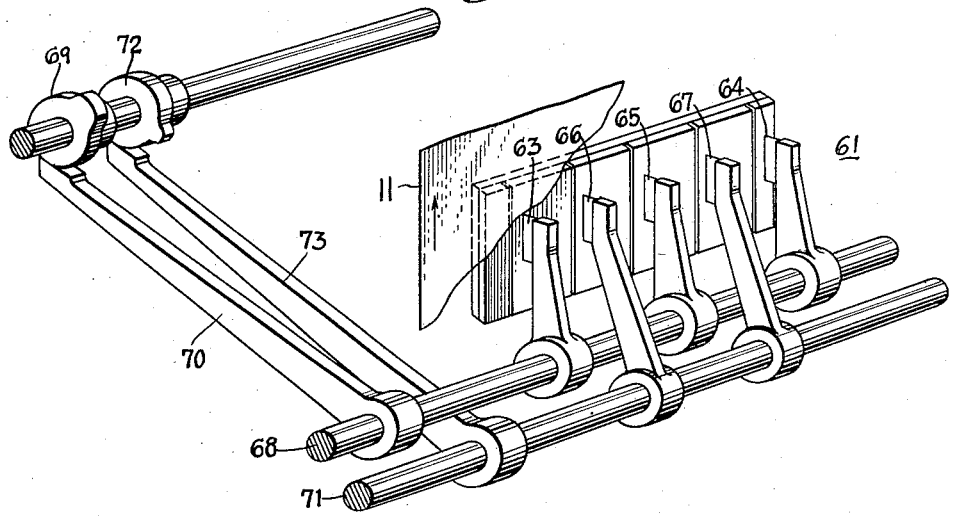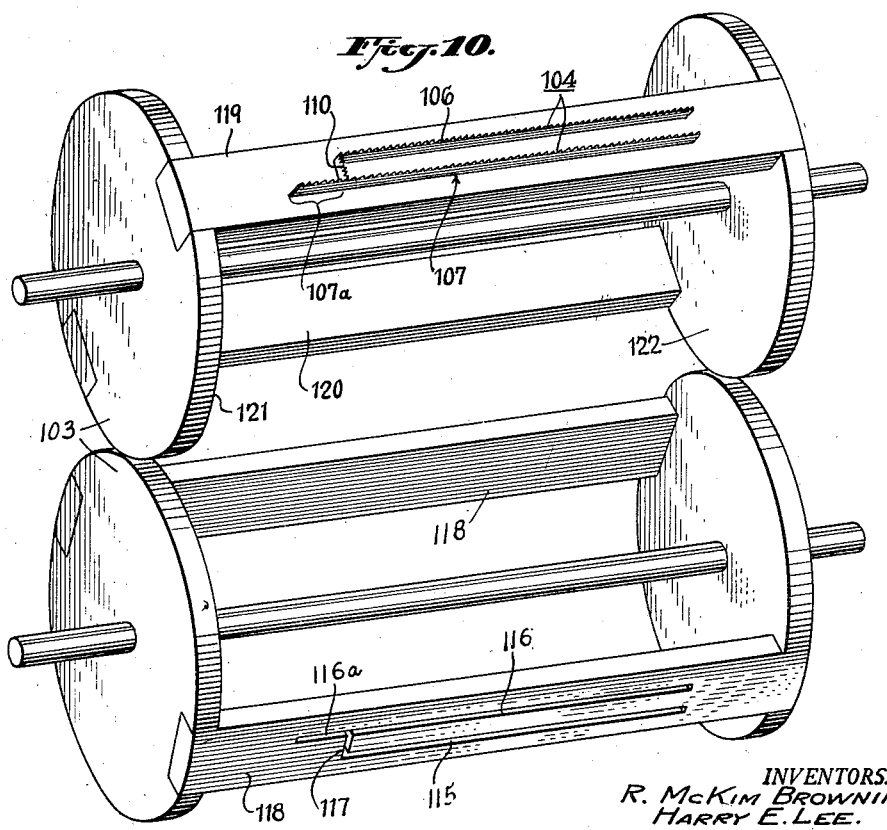

Dec. 31, 1957   R. McK. BROWNING ET AL   2,818,003
APPARATUS FOR MAKING A MULTI-PLY VALVE BAG HAVING
AN EXTENDED INTERMEDIATE VALVE PLY
Filed Sept. 3, 1953   8 Sheets-Sheet 8
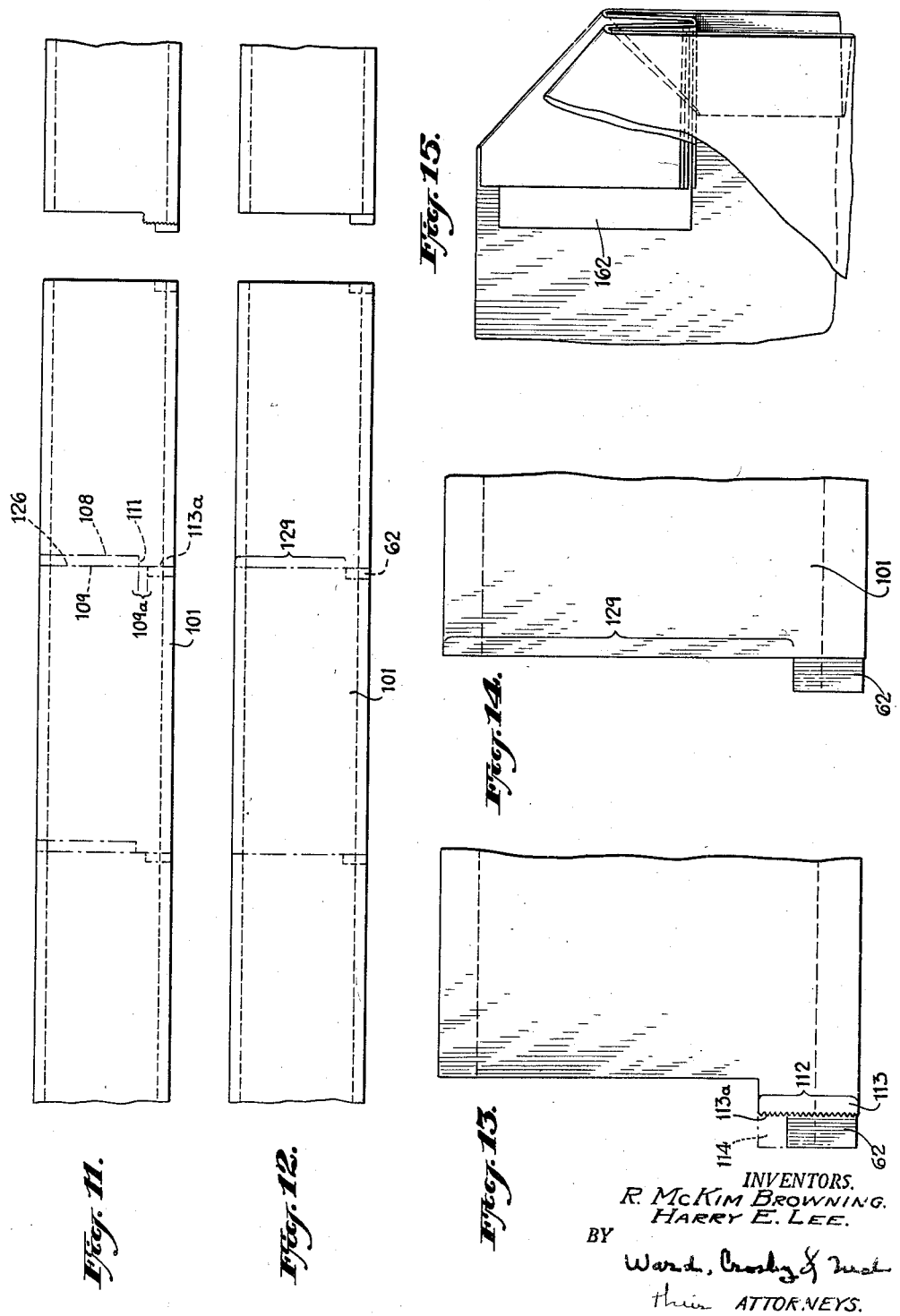
INVENTORS.
R. McKIM BROWNING.
HARRY E. LEE.
BY
ATTORNEYS.

United States Patent Office 2,818,003
Patented Dec. 31, 1957

2,818,003

APPARATUS FOR MAKING A MULTI-PLY VALVE BAG HAVING AN EXTENDED INTERMEDIATE VALVE PLY

Randolph McKim Browning and Harry E. Lee, Pensacola, Fla., assignors to St. Regis Paper Company, New York, N. Y., a corporation of New York Application September 3, 1953, Serial No. 378,340

16 Claims. (Cl. 93—8)

This invention relates to apparatus for manufacturing multi-wall valve bags from webs of paper or other thin sheet material, and more particularly relates to apparatus for manufacturing multi-wall paper valve bags having at least one intermediate ply extended at the valve corner relative to the other plies. Such extended intermediate ply is adapted to form a valve extension closure flap for the valve of the finished bag. The machine of the invention is adapted for association with bag valver apparatus for forming a corner of each bag tube, with such extended intermediate ply, into a sleeved bag valve corner, whereupon, for example, sewing apparatus can form a sewn seam across the ends of each such tube.

The invention, in one aspect thereof, is constituted by the aforementioned machine for manufacturing multiply paper valve bags, an intermediate ply being extended at the valve corner relative to the other plies to form such closure flap. A tube former is employed for folding a plurality of superimposed paper webs as drawn therethrough into a multiply tube. Suitable pull roll means are provided adjacent the exit of said tube former for pulling the formed tube and webs through the machine. The particular disposition of the inner-end edges of the plies at the valve region is obtained by means of a plurality of rotary perforators which are positioned in advance of said tube former for weakening the webs which are to form the inner and outer plies along lines which are transverse to said webs but only along a portion of the transverse dimension thereof. Additional perforators are provided for perforating the webs which are to form the plies intermediate to said inner and outer plies, such perforators weakening at least one of such intermediate plies along lines which are differently shaped from that of the weakened lines of the inner and outer plies. Thus at least one of such weakened lines in such intermediate ply is spaced from the weakened lines of the inner and outer plies thereby to form such extended intermediate ply in response to separation of the bag tube blanks from the bag tube as will appear below. Thus the perforators are provided with perforator means which are positioned for forming such weakened lines in preselected relative positions, the ends of such lines being placed in register by the aforementioned tube former. Thereafter, as aforementioned the tube former folds the perforated webs into the tube with such weakened lines at the valve corner region of the bag tube. It is of course possible instead of merely perforating the intermediate extended ply to cut same fully throughout the desired line. Means are provided for thereafter making, at bag length intervals, a transverse cut across a portion of the webs, after formation of such webs into a bag tube, such cut extending from the registered ends of such perforation lines across the theretofore uncut portion of the tube to the opposite edge thereof. Such means for making this cut may be in the form of a notch cutter for forming the notched type of bag. Such notch cutting means in one form of the invention is shaped to cut a notch which is less in length than the uncut portion of the tube, but such notch cutting means is provided with an extension which extends such transverse cut from the inner end of the notch to the inner registered ends of such lines. That is, the notch cutting means is provided with a cutting device for cutting out the rectangular notch from the tube, there being an extended portion which protrudes therefrom transversely of the web and which forms that part of the notch cutter for interconnecting the notch cutting portion proper to the registered ends of the aforementioned lines.

The invention will be described with reference to a machine constructed and adjusted to manufacture bag tubes each having at least one extended integral intermediate ply at its valve corner, which tubes can be valved in any well known valving machine. A tubing apparatus, such as that shown in U. S. Patent No. 2,581,801 can be employed, preferably but not necessarily, the modification thereof for making bag tubes which do not have stepped ends, the bag tube cut-off unit thereof and the perforating means thereof being modified as described below.

Various other objects, features and advantages of the invention will clearly appear from the detailed description given below taken in connection with the accompanying drawings which form a part of the specification and illustrate, by way of example, one form of apparatus which may be used in carrying out the invention. The invention resides in such novel features, arrangements and combinations of parts as may be shown and described in connection with the apparatus herein disclosed.

In the drawings:

Figs. 1, 1a and 1b comprise a view in side elevation and partly in longitudinal section, of a multi-wall bag tubing and web perforating machine in accordance with a preferred modification of the invention, Figure 1a being a continuation of Fig. 1 as taken along line a—a of Fig. 1; while Fig. 1b is a continuation of Fig. 1a as taken along line b—b of Fig. 1a;

Fig. 2 is a plan view of the portion of Figs. 1 and 1a located between lines c—c and d—d thereof; while Fig. 2a is a plan view of the portion of Figs. 1a and 1b located between the lines d—d and e—e thereof;

Fig. 2b is a view in side elevation of a conveyor system for moving the bag tubes relative to a valver, Fig. 2b being a continuation of Fig. 2a as taken along line f—f;

Fig. 3 comprises a view in side elevation upon a slightly enlarged scale of portions of the apparatus shown in Figs. 1a and 1b, particularly the bag tube cut-off means;

Fig. 4 is an enlarged vertical cross section of one of the perforator and glue applicator units as taken substantially along line 4—4 of Fig. 2, this unit perforating transversely partially across those plies which pass there-through at bag length intervals in the valve region only, and applying transverse glue lines to certain of the plies also at the valve regions of such plies;

Fig. 5 is a vertical section of the perforator of Fig. 4, partially in section, as taken substantially along 5—5 of said Fig. 4;

Fig. 6 is a face view of a means which is substantially similar to the perforator shown in Fig. 5 with the exception that the device in Fig. 6 is adapted for making a partial transverse cut in lieu of a perforation, that is, the cut is fully through the web without mere intermittent cuts separated by uncut portions, the extent of the cut being only over a portion of the transverse dimension of the web in the valve region;

Fig. 7 is an exploded view of a plurality of plies of paper which are formed into a bag tube by the aforementioned bag tubing machine, such plies being shown after having been subjected to the perforating, glue applying and slitting means of Fig. 1a;

Fig. 8 is a plan view of a plurality of the super-imposed webs after undergoing partial perforation and slitting at the valve region and before being formed into tubes and a final notch cut has been made therein;

Fig. 9 is a perspective view of a web slitting device which may be employed in the present apparatus;

Fig. 10 is a perspective view of notch cutting knives and related supporting means together with cooperating female members for co-acting with the knives;

Fig. 11 is a plan view of a gusseted bag tube formed by the apparatus of the present invention and having an extended integral intermediate ply at the valve corner region thereof, such figure showing a transverse oblong portion which is cut from the bag tube thereby to form bag tube blanks of the notched variety, and also showing a bag tube blank or length which has been severed and pulled apart or separated from the bag tube proper, the bag tube lengths formed in accordance with Fig. 12 having the notched type of valve and the integral intermediate ply for extending inwardly into the bag.

Fig. 12 is a plan view of the gusseted bag tube formed in accordance with the present invention and similar to that shown in Fig. 11 with the exception that the bag tube is cut to form a notchless type of valve, Fig. 12 also showing a fully separated bag tube blank;

Fig. 13 is a side view on a somewhat enlarged scale of a gusseted bag tube blank formed in accordance with the present invention and prior to the valving of the valve corner of such blank, the bag tube blank of Fig. 13 comprising the notched type;

Fig. 14 is a view analogous to Fig. 13, the bag tube length being of the notchless variety;

Fig. 15 is a perspective view of a fragment of a valve corner of a notched type of valve formed by the apparatus of the present invention and indicating the inwardly extending integral intermediate ply formed by the machine of the present invention; and Fig. 16 is a plan view of means of controlling the linear speed of the web passsing through the machine of the present invention.

The particular perforators, pasting apparatus and web assembly arrangements as shown in Fig. 1a are like those of the above-mentioned Patent No. 2,581,801 of Marcel Lienart, and these features are shown in this form merely by way of example.

Referring now to the drawings and particularly to Figs 1 to 2a, inclusive, and considering first the overall operation of the apparatus; the novel extended integral intermediate ply forming and bag tubing machine is illustrated as set up to manufacture a five ply bag tube, the various paper plies 10–14, inclusive, of which are fed respectively from paper rolls 15–19, inclusive, individually mounted on roll stands one of which is illustrated at 20, which includes conventional facilities as indicated for shifting a new roll of paper in place as the paper becomes exhausted from the previous roll. For maintaining appropriate back tension on the paper webs, a belt 21 of canvas or the like having one end secured to a cross walk 22 is looped over the roll and terminates at a weight 23. Each web, such as 14, in passing off of the paper roll, such as 19, is fed under a guide roll one of which is shown at 24 and thence over a resiliently mounted guide roll 25 from whence it is fed under the next guide roll, for example 26, whereby the two webs are superimposed, this procedure continuing for the next successive webs until all 5 webs are superimposed in passing under a final guide roll 27. The rolls of paper are so positioned in the roll stands that the webs are fed in transversely stepped relation, 28 (Fig. 2). However, at the region 29 (Fig. 1) the uppermost web 10 is separated from the remaining webs passing over the guide roll 30, the remaining webs 11–14 inclusive passing under this roll.

The uppermost web 10 passes under a guide roll 31 (Fig. 1a) in a perforating unit A, and thence respectively over and under a pair of driven pull rolls 32 and over appropriate additional guide rolls 33, 34, 35, 36 and 37 and hence through a perforator 38 wherein it is perforated along the line 39 (Fig. 7). That is, the perforator forms a weakened line 39 comprising a series of small cuts separated by small uncut portions, as opposed to an uninterrupted cut line. The web 10 then passes over suitable additional guide rolls 40–43 inclusive from which the web is directed toward a web assembly roll unit to be described hereinafter.

The term "perforation" or "perforation line" as used herein refers to a series of short cuts separated by uncut portions. The term "cut" or "cut line" as used herein refers to a continuous or uninterrupted cut. The expression "partition line" embraces both perforations and cuts.

The next web 11 is also directed to the perforator unit A beneath a guide roll 44 and thence over and under a pair of driven pull rolls 45 from which it passes over additional guide rolls 46 and 47 and thence through a perforator 48 which forms a perforated line 49 (Fig. 7). Line 49 may comprise an uninterrupted cut if desired, instead of the perforation or interrupted cuts as shown. After the web 11 passes through the perforator 48 it is directed over additional guide rolls 50a, 50–53 inclusive and thence past a glue applicator 54 which applies a glue line 55 (Fig. 7) thereupon, which is substantially parallel to the weakened line or perforation 49 but is somewhat removed therefrom as indicated in said figure. The glue line 55 of course serves to adhere the webs 10 and 11 to one another at the valve region along an area which is slightly below the weakened line 39 as viewed in Fig. 7.

The perforator 48 may form either the weakened line 49 as shown in Fig. 7 or it may form an uninterrupted cut fully through the web. However, it is preferred to form the perforation as shown in such figure.

Furthermore, the perforator 48 is so positioned with respect to the perforator 38 and also with respect to the subsequent perforators, as will appear hereinafter, that the weakened line 49 when the webs are superimposed, is slightly spaced from the other weakened lines whereby the intermediate ply 11, at the valve region, is provided with an integral extension.

Cooperating with the perforator 48 and for the purpose of forming a plurality of slits 56–60 inclusive (Fig. 7) is a slitter unit 61 (Figs. 1a and 9).

The extended integral intermediate ply is designated generally by the number 62.

For the purpose of forming the end slits 56 and 60 of the extended ply 62 there are provided slitter knives 63 and 64 (Fig. 9). The center knife 65 is provided for forming the center slit 58.

The end slits 56 and 60 of course define the transverse end edges of the extension 62 whereas the slit 58 is for the purpose of effecting a more efficient closure when the bag has been filled.

The intermediate knives 66 and 67 are provided for forming the slots 57 and 59 which, for example, may be situated at that portion of the extension 62 which is to form the corners of the extending valve flap when the bag has been filled.

The three knives 63, 64 and 65 preferably are mounted upon a common shaft 68 (Fig. 9) which is angularly shiftable by means of a cam 69 which is operatively connected with the shafts 68, for example, by means of a lever 70 which is secured thereupon. The cam 69 is driven in proper timed relationship with the movement of the web 11.

Analogously the knives 66 and 67 are mounted upon a shaft 71 which is angularly shiftable in response to the movement of a cam 72, the latter being operatively connected to the shaft 71 by a lever 73. The levers 70 and 73 may have suitable cam follower rollers which engage their respective cams. The cam 72 also is driven in timed relationship with the respect to the web 11.

The term "perforator means" as employed herein with respect to the intermediate web having the extended integral intermediate ply embraces not only the perforator 48 but also the slitter unit 61.

After the web 11 has passed the perforator means aforementioned and also the glue applicator 54 it is directed past the further guide roll 74 and thence to said assembly roll unit.

The next pair of webs 12 and 13 is directed to a perforating and gluing applicator unit, designated generally B, respectively over guide rolls 75 and 76. Thence such webs 12 and 13 respectively are directed over and under pull roll units 77 and 78 which are similar to the pull roll units 32 and 45 above described. Thence the webs 12 and 13 are guided over appropriately disposed additional guide rolls into superimposed relationship at 79, from whence they are led past the perforator 80 in which webs 12 and 13 are identically perforated at bag length intervals respectively along lines 81 and 82 (Fig. 7). Such lines 81 and 82 and the analogous perforation 83 for the web 14 (Fig. 7) are made at the valve region and only partway across the web and at said bag length intervals. Such analogous perforation 83, when the webs are superimposed, is positioned immediately beneath and in register with the perforations 82, 81 and 39.

The webs 12 and 13 after passing through the perforator 80 are respectively directed to glue applicator units 84 and 85 which respectively print beneath the lines 81 and 82 the glue lines 86 and 87 (Fig. 7).

Thereafter the webs 12 and 13 are directed over appropriately positioned guide rolls toward the aforementioned web assembly roll unit.

The single web 14 in turn is directed to a perforator and glue applicator unit C via a guide roll 88 (Fig. 1a) and thence over a driven pull roll unit 89 whereupon it is directed over further suitably positioned guide rolls past a perforator unit 90 which forms the aforementioned weakened line 83 and from whence the web 14 is directed past a glue applicator unit 91 for applying a glue line 92. Thereafter the web 14 also is directed to the web assembly roll unit.

The aforementioned web assembly roll unit is generally indicated at D (Fig. 1a). Each of the perforator and glue applicator units B and C of Fig. 1a is closely similar to analogous units shown in Fig. 1a of U. S. Patent 2,581,801, granted June 8, 1952, with the exception that in the form shown herein, as is well shown in Fig. 5 a rotatable unserrated knife 80a is employed which is of a length equal to, for example, line 39 in web 10 (Fig. 7) and which rotatable knife 80a coacts with a stationary serrated knife 80b to form a perforation line. In Fig. 6 a rotatable unserrated knife 80c, equal in length to knife 80a, coacts with an unserrated stationary knife 80d to form a cut line as opposed to a perforation line. More particularly, the perforator unit B of the present Fig. 1a is substantially identical to the perforator unit B of the aforementioned patent with the above exception, and the perforator unit C of the present invention is substantially identical to the perforator unit A of said patent with the exception that the unit shown in the present invention employs a glue applicator means in conjunction therewith.

Reverting now to Fig. 1a, after the webs have been perforated in the units A, B and C as illustrated in Fig. 7, such webs are directed toward such web assembly roll unit D. This unit may be identical to an analogous unit shown and described in the aforementioned U. S. Patent 2,581,801.

A further glue applicator 93 is provided for printing glue lines along the downwardly exposed stepped longitudinal edges (three of which are shown at 10a, 11a and 12a of Fig. 2) of the successive paper plies.

In the web assembly roll unit D the various perforations or weakened lined are brought togethed at roller 93a by virtue of the super-position of the webs. The relative positions of such perforations are shown in Fig. 8 wherein the superimposed perforations 39, 81, 82 and 83 are represented collectively at 94 in said Fig. 8. The integral portion of the web or ply 11 which is to form the extension 62 (also referred to as extended intermediate integral ply portion 62) is also represented in Fig. 8 by the same numerals shown therefor in Fig. 7.

Referring again to Fig. 8 it will be seen that the various perforation lines in the several webs have been formed in such a way that the extremities thereof are in register; that is, as viewed in Fig. 8 the left hand extremities of the perforations are all in register and super-imposed, and also the right hand extremities thereof are in register and superimposed. The slits 56 and 60, plus the perforation 49, are considered in this instance as a single perforation. When the various webs have been passed through the tube forming device, to appear hereinafter, a gusset will be formed therein and all of the extremities or ends of such perforations will be superimposed and in register; that is, the left hand extremities of the perforations will be folded over and placed in register with the right hand extremities thereof.

It is to be understood that although only one of the several intermediate plies (11, 12 and 13) has been formed or perforated to form an extended integral ply it is possible to perforate other of such intermediate plies for such extension.

Referring again to Fig. 8 it will be seen that the length of the line 49, which is the transverse dimension of the extended integral ply, is less than the width of the remaining portions of the web which are to extend inwardly and form the balance of the inwardly extending valve. That is the maximum dimension of such notch is indicated at 95, such notch to comprise the balance of the inwardly extending portions at the valve corner when the valve bag is formed.

As will appear more fully hereinafter a notch cutter, when the webs have been folded into a tube, will form the cut lines 96 and 97, the longitudinal slitter portion of the notch cutter forming the slits 98 and 99 (Fig. 8). It is of course understood that Fig. 8 represents a layout of the webs prior to the tubing, the notch cutter being applied to the folded tube as illustrated in Figure 2a.

Thereafter the now superimposed webs 10–14 which have been brought together in the web assembly roll D are now directed to a tube and gusset forming unit illustrated generally at E, which also may be substantially similar to that shown and described in the aforementioned U. S. Patent 2,581,801 with the exception that there is here employed a gusset forming device 100 of well known construction.

Such tube and gusset forming unit E takes the staggered superimposed plies, folds them over, forms two gussets therein and thereby produces the tube, as shown in Fig. 2a and Fig. 11, the latter tube being indicated at 101 and being adapted for the formation of a valve having a notched type valve corner with the integral extended intermediate ply protruding therefrom of the type for forming an inwardly extending sheet. Thereafter the bag tube 101 (Fig. 11) is directed to a bag tube cut-off unit shown generally at F (Figs. 1b and 3) which in the form shown in Fig. 3 is designed for forming a so-called notched type of valve corner similar to that described above in connection with Fig. 11. The bag tube cut-off unit F is constituted by a pair of superimposed feed rollers 102 for grasping the bag tube and pulling same through the tube and gusset forming unit E. If desired, a plurality of such superimposed feed rollers may be employed and these may comprise the main pull rollers for the entire machine. However, we have found it desirable to employ also the several sets of pull rolls in the perforator units A, B and C aforementioned. The tube 101, after passing through the feed rollers 102, is directed to a pair of superimposed cut-off rollers 103. Such cut-off rollers 103 include two pairs of knives 104 and 105 (Fig. 3) extending transversely across the tube path for the purpose of cutting across those portions of the tube not previously perforated. The knives of the bag cut-off unit are well illustrated in Fig. 10 wherein the novel notch cutting means is shown. The notch cutter including knives 104 comprises individual knives 106 and 107. The knife 106 is provided for making a cut along the line 108, as shown in Fig. 11, and the knife 107 is provided for making the cut along the line 109, as shown in said figure. It is noted that the knife 107 has an extension 107a for the purpose of making the cut along the line 109a (Fig. 11). Such knife extension or prong cooperates with longitudinally extending slitter knife 110 (Fig. 10) which is capable for forming the cut along the line 111 (Fig. 11).

Referring to Fig. 13, it will be seen that the novel apparatus forms a bag valve corner wherein the extension 62 is of a smaller transverse dimension, as shown in this figure, than the dimension 112 of the notch 113. The reason for this, in this form of the invention, is to provide a machine which will eliminate a portion 114 from the extended intermediate ply thereby providing a lesser thickness which need be sewn by the sewing machine and increasing the pliability of the extended intermediate ply; however, the invention is not limited to a machine for forming the valve corner region, as shown in Fig. 13, it being possible wthin the purview of the invention to form an extended intermediate ply wherein the portion 114 is retained.

Referring again to Fig. 10, it will be seen that the knives 106, 107, 107a and 110 respectively cooperate with grooves 115, 116, 116a and 117 within a bar 118 which is carried by the lowermost of the rollers 103, as shown in Fig. 3. It is, of course, understood that a pair of the bars 118 is employed in diametrically opposed relationship for proper cooperation with the knives 104, 105 (Fig. 3).

Eevery half revolution of the cutter cuts one bag length, its length being determined by the speed of the web relative to the speed with which the cutter is rotated.

It has been found desirable to mount the aforementioned knives 106, 107, 107a and 110 in suitable transversely extending bars 119 and 120 which are rigidly secured to axially spaced discs 121 and 122 in the upper roller 103 of Fig. 3.

After the bag tube has been cut across, as shown in Fig. 11, means are provided for pulling the bag tube blank so severed from the remainder of the advancing bag tube, thereby to pull apart the perforations formed at the valve corner region. Thus suitable bag tube blank grasping means are employed which operate at a greater speed than the feed or pull rollers 102. Such means comprise bag tube blank pull-away means shown generally at 123 (Fig. 1b) which consists of a rotating pinch bar 124 which operates in a well known manner in cooperation with a lower backing roll 125 to grasp each bag tube after being partly cut across by the knives and thus to sever the perforations made at the valve corner.

It will be noted above that the rectangular cut well illustrated in Fig. 11 by the lines 108, 109, 109a and 111, whereby an oblong portion 126 is cut away, forms a notch type of valve corner. The trailing knife 107, 107a which reaches the bag tube last, extends transversely in alignment with the aftermost edge 113a (Figs. 11 and 13) of the notched valve corner.

Thereafter a pair of superimposed delivery rolls of conventional construction designated at 127 (Fig. 3), grasps each bag tube blank and delivers same onto a conveyor 128 which removes same.

When it is desired to form the notchless type of bag of the type shown in Fig. 12, one knife of each of the pairs 104, 105 (Fig. 3) is removed and the remaining knife of each pair, together with the remainder of the cut-off mechanism, is adjusted for forming at bag length intervals a transverse cut, as at 129, which is in alignment with the perforations 94 (Fig. 8). It is of course understood that the longitudinal slitter knife 110 is also removed for the making of such notchless type bag.

Referring now to Fig. 2b, after the bag tubes have been formed, as above described, and delivered to the conveyor 128, the latter thereafter may deliver same to a valver 130 of conventional design.

The valver 130 will shape the valve corner of the bag tube into the conformation shown in Fig. 15 and the bag tube can be formed into a finished bag by sewing same across the top thereof. A suitable closure tape can be employed therewith, if desired.

It is, of course, understood that all of the parts in the above-described apparatus are operated in timed relationship by any suitable means.

Referring now to Fig. 16, the means will now be described for adjusting the speed of the perforator knives and the cutter knives in order to insure that the perforations and/or cuts made thereby occur in proper phase relationship:

(a) With one another; and
(b) With a series of printed impressions upon the web, such impressions having been pre-printed.

The term "pre-printed impression upon the web" refers to impressions which are printed upon the roll of paper before the paper is positioned in the roll stand, such as 20, and is to be distinguished from impressions which are printed upon the web immediately prior to the passing of the web into the bag making machine, for example, by a web printing machine which is situated in line with but ahead of the bag making machine.

A problem arises in insuring that the perforations made by the units A, B and C reach the cut-off device F in proper alignment with the cut-off knives 104, 105 and similarly a problem arises with respect to the outer web which bears the printed impressions in that it may slip slightly in the machine and may not be drawn therethrough at the precise speed required for proper phase relationship between the impressions and the aforementioned perforators and notch cutters. Conversely the printed web may become somewhat advanced relative to its desired position and thus may move out of proper phase relation with the perforators and transverse tube cutters, such as the notch cutters.

In order to overcome the above difficulties, speed control means are provided for the perforator-paster unit A, B and C as a group and separate speed control means are provided for the cutter unit 103.

A series of reference marks are printed upon the outer web, each one in a preselected uniform position with respect to each printed impression. A pair of conventional photoelectric devices are employed, one for the group of perforator-paster units (A, B and C), and one for the cutter unit 103, each being designed for scanning the web in timed relation with the rotational movement of its respective unit to determine whether or not the reference mark upon the web is in a desired position with respect to its respective unit.

If the reference mark printed upon the web is out of position, the photoelectric device slows or increases the speed of its respective unit by suitable means to appear hereinafter, whereby such unit is brought into proper phase relationship with the reference mark and hence with the printed matter. This not only assists in holding the printed impression in proper phase relationship with the perforator means and the transverse tube cutter means, but also assists in holding the perforation lines made by the perforator means in proper phase relation with the cut lines made by said cutter means.

One form of means for accomplishing the above result is schematically shown in the aforementioned Fig. 16 and comprises a main drive motor 131 which is directly connected to the draw rolls 102 by a suitable direct operative interconnection 131a. Motor 131 via connection 131b, change gears 132 and an operative interconnection schematically shown at 133 is connected to the group of perforator units A, B and C. Interposed in the operative interconnection 133 is a first main compensator 134 in the form of a differential which is driven jointly by motor 131 (via connection 133) and by a manually adjustable variable speed control device 135, which may be of the type known as a PIV (positive, infinite, variable). The PIV 135 in turn is directly driven by the main drive motor 131 via an operative interconnection 136.

I have found it desirable to employ such PIV not only for the driving of the first main compensator 134 for such perforator group but also for driving a second main compensator (or differential) 137 for the cutter elements 103.

The main drive motor 131, via connection 131b, change gears 132, also is drivably connected to the compensator 137. A second speed input is made to differential 137 from the PIV 135. Thus it will be seen that a common PIV which is manually adjustable is capable of introducing a speed control factor jointly to the perforators A, B and C and to the cutters 103 to assist the change gears 132 initially to bring the perforators and cut-off knives at least temporarily in proper phase relation with one another and with the reference marks.

In order to speed up or slow down, for example, the perforators in order to bring the perforation lines made thereby into proper phase relationship with the printed reference mark upon the printed web (and also with the cut made by the cutter elements 103), a photoelectric device schematically shown at 138 is employed which periodically scans the web near the perforator units, the frequency of such scanning being a direct function of the rotational speed of, for example, the perforator 90 of unit C. Such photoelectric device is sensitive to the light energy reflected from the web and if such reflective energy departs from a preselected norm, the photoelectric device will actuate a reversible motor 139 which comprises a portion of an auxiliary compensator 140 which includes also a differential 140a interposed in the operative interconnection 141 between the PIV 135 and the main compensator or differential 134. Thus the reversing motor 139 is capable of introducing a speed adjustment factor via the differential 140a for the perforator units.

The PIV 135 is operatively connected to the other main compensator 137 by operative interconnection 142 in which is interposed an auxiliary compensator or differential 143, the latter in turn being under the influence of a photoelectric device 144 which controls a reversible electric motor 145 in a manner analogous to the photoelectric device 138 and its motor 139. The photoelectric device 144 similarly scans periodically the printed web near cutter 103 to determine whether or not the printed reference mark thereupon is in proper phase relation with the cutter elements 103 and actuates the reversible motor 145 in the proper direction when such web reference mark is out of position.

Thus all of the perforators (and pasters) are adjusted in speed in response to the position of a series of reference marks printed on the web, one for each printed impression. The same series of reference marks are employed for the adjusting of the speed of the cutter elements 103. Consequently a common norm is employed for controlling the speeds of: (a) the perforators, and (b) the cutter elements 103. Thus the phase relationship of the perforation lines made by such perforators with the cut lines made by the cutter elements 103 are accurately controlled.

While the invention has been described with respect to certain preferred examples, it will be understood by those skilled in the art, after understanding the invention, various changes and modifications may be made without departing from the spirit and scope of the invention, and it is intended therefore in the appended claims to cover all such changes and modifications.

What is claimed is:

1. In apparatus for making multi-ply valve bags, a multi-ply paper bag tubing machine having a plurality of roll stands from which paper webs are supplied, and a tube former followed by pull rolls for drawing the webs through the machine, a plurality of perforator units each containing means for forming partition lines in the web or webs passing therethrough along a line transversely thereof at bag length intervals across part of the width thereof in the valve region, said means being movable in timed relationship and adjusted whereby the left extremities of such lines thereof are moved into register with one another and the right extremities are also moved into register with one another prior to reaching said tube former, one of said partition line forming means other than for an inner and an outer web being positioned for forming such a line which over a substantial portion of the length thereof is spaced from the other of such lines, said tube former being constructed and arranged for folding said webs upon one another to place said registered left extremities of such lines in register with said registered right extremities, means for partially cutting across such webs after formation thereof into the tube by such tube former, such cut extending from the registered extremities of such partition lines across the theretofore unpartitioned tube portion to the opposite edge thereof, means for separating each bag tube blank from the preceding tube after such partial transverse cutting, and means for valving such separated bag tube blank at the valve corner thereof.

2. In a machine for manufacturing multi-ply paper valve bags having a portion of at least one intermediate ply extended at the valve corner relative to the other plies at such corner, the combination comprising: a multi-ply paper bag tube former having a plurality of roll stands from which paper webs are supplied, said tube former having pull rolls for drawing the webs through the machine, a plurality of perforator units preceding such tube former each containing means for forming transverse partition lines at the valve region the web or webs passing therethrough transversely thereof along lines comprising a minimum portion of the width thereof substantially equal to the width of such extended ply portion said perforator means being positioned for forming such lines in preselected relative positions whereby the ends thereof are placed in register by said tube former, at least one of said partition line means for an intermediate web being shaped to form such a line which except for the registered ends thereof is removed from the other lines after the webs have been tubed, thereby to form such extended ply portion in response to separation of the bag tube blanks, and means for making cuts across a part of such webs at bag length intervals after formation of the tube by such tube former, such cut extending from the registered ends of such lines across the theretofore unpartitioned part of the tube to the opposite edge thereof.

3. A machine for manufacturing multi-ply paper valve bags having a portion of at least one intermediate ply extended at the valve corner relative to the other plies comprising in combination: a multi-ply paper bag tube former having means for pulling a plurality of paper webs therethrough, each web forming a ply of the bag tube, a plurality of web perforator units situated ahead of such tube former, each such unit having perforator means for perforating in the valve region the web or webs passing therethrough transversely thereof and along lines the ends of which are separated by a distance substantially equal to the width of said extended ply portion, said perforator means being constructed and arranged for forming such lines in preselected relative positions whereby the ends thereof are placed in register by such tube former, one of such perforator means for at least one intermediate web being constructed to form a line of different shape as compared to the lines in the inner and outer webs thereby to form such extended ply portion in response to the separation of bag tube blanks from the bag tube, tube cutter means for making at bag length intervals a cut across a part of said webs after formation of such webs into a bag tube by said tube former, such cut extending from the registered ends of such lines across the theretofore unweakened part of the tube to the opposite edge thereof, means for pulling each bag tube blank, after each such cut, away from the preceding bag tube thereby separating the perforated portions of the webs connecting such bag tube blank and bag tube, and means for valving the corner of such blank.

4. A machine for manufacturing multi-ply paper valve bags having at least one intermediate ply portion extended at the valve corner relative to the other plies comprising in combination: a multi-ply paper bag tube former having means for pulling a plurality of paper webs therethrough, each web forming a ply of the bag tube, a plurality of web units, including perforator and cutter means, situated ahead of such tube former, preselected of such units having means for making a weakening line in the valve region only of the web or webs passing therethrough transversely thereof, one of such units for an intermediate web being constructed to form such a line of different shape as compared to the other lines thereby to form such extended ply portion in response to the separation of bag tube blanks from the bag tube, said units being constructed and arranged for forming such lines in preselected relative positions whereby the ends thereof are placed in register by such tube former, means for making at bag length intervals a cut across a part of said webs after formation of such webs into a bag tube by said tube former, such cut extending from the registered ends of such lines across the theretofore unweakened portion of the tube to the edge thereof, and means for pulling each bag tube blank, after each such cut, away from the preceding bag tube thereby separating the weakened portions of the webs connecting such bag tube blank and bag tube.

5. In a machine for manufacturing multi-ply paper valve bags, an intermediate ply being extended at the valve corner relative to the other plies, the combination comprising: a tube former for folding a plurality of superimposed paper webs as drawn therethrough into a multi-ply tube, pull roll means adjacent the exit of said tube former for pulling the formed tube therethrough, a plurality of rotary knife devices positioned in advance of said tube former for weakening the webs which are to form the inner and outer plies of the tube along lines transverse to such webs, knife devices for weakening along preselected lines the webs which are to form the plies intermediate to said inner and outer plies, at least one of said last-named devices being positioned for weakening at least one of said intermediate webs at the valve region thereof along lines which are differently shaped from that of the weakened lines of the inner and outer plies, whereby at least one of said weakened lines formed in an intermediate ply is spaced from the weakened lines of said inner and outer plies thereby to form at least one intermediate ply having a valve portion which extends outwardly from the remaining plies when the several bag tubes are pulled apart, said weakened lines having their ends spaced apart substantially the same distance and in a line transverse to said webs, said tube former folding such webs into a tube with such weakened lines at the valve corner of the bag tube, and means for cutting out a notch from such tube at bag length intervals, said notch cutter means being shaped to cut a notch which is less in longitudinal dimension than the unweakened portion of such tube measured transversely of such tube, such notch cutting means having a transversely extending portion for extending the transverse cut thereof from the inner end of the notch to the inner end of said weakened lines.

6. In a machine for manufacturing multi-ply paper valve bags an intermediate ply at the valve corner region thereof being extended relative to the other plies thereby to form an extension, the combination comprising: a tube former for folding a plurality of superimposed paper webs as drawn therethrough into a multi-ply tube, a plurality of rotary knife devices positioned in advance of said tube former for weakening the webs which are to form the inner and outer plies along lines transverse to said webs, said lines having their respective extremities in register when the webs are superimposed and said lines extending across the valve region only of such webs, means for forming weakened lines in the webs which are to form the plies intermediate to said inner and outer plies, said last-named means weakening at least one of said intermediate webs along a line which is positioned to define the inner end edge of the aforementioned extension, such inner end edge being spaced from the weakened lines of said inner and outer plies, the extremities of said weakened lines being positioned in register in said tube former, the extent of said weakened lines formed by said knife devices being coincident with the transverse dimension of said extension, and notch cutting means for cutting out notches from such tube at bag length intervals positioned whereby the registered extremities of said weakened lines are spaced from the innermost extremity of said notch cutting means, knife means for forming at bag length intervals a cut interconnecting the inner extremity of said notch cutting means with the registered extremities of said weakened lines, means for separating each bag tube blank so cut from the advancing main bag tube thereby pulling apart the weakened lines of the bag tube, and means for folding the valve corner of each separated bag tube into a valve, such extension of an intermediate ply at the valve corner of the bag tube extending inwardly of the bag tube to a greater extent than the inner and outer plies at such region.

7. Apparatus in accordance with claim 3, including power means for driving said perforator units and tube cutter means, the latter means being substantially removed from such units, a common variable speed control device drivably interconnected to said tube cutter means and said perforator units by suitable respective main differential means whereby such variable speed control device can introduce a positive or negative common speed control factor to said perforator units and such tube cutter means, photoelectric means constructed and arranged for periodically scanning near said perforator units printed reference marks upon one of said webs, such photoelectric means being operatively interconnected to one of said perforator units in order to effect such periodic scanning at the frequency of rotation thereof; auxiliary differential means interposed in the operative interconnection between said variable speed control device and the aforementioned main differential means for said perforator units, reversible power means drivably connected to said auxiliary differential and under the influence of said photoelectric means for introducing a speed adjustment to said perforator units in response to the phase relationship of such printed reference marks with the movement of said perforator units, a second photoelectric means positioned near said tube cutter means for scanning said printed reference marks in response to the frequency of rotation of said tube cutter means, and means for introducing a speed control adjustment to said tube cutter means via the operative interconnection between said variable speed control device and the aforementioned main differential means connected to said tube cutter means.

8. A machine for manufacturing multi-ply paper valve bags comprising in combination: a multi-ply paper bag tube former having means for pulling a plurality of paper webs therethrough, each web forming a ply of the bag tube, a plurality of web perforator units situated ahead of such tube former, and a tube cutter situated removed from and following such tube former, one of said webs having a series of reference marks printed thereupon at a common interval; means for driving said perforator units and said tube cutter means, including a common variable speed control device, the latter having a first operative interconnection between itself and said perforator units and a second operative interconnection between itself and said tube cutter means, photoelectric means for periodically scanning said series of reference marks in response to the speed of movement of said perforator units, power means for introducing in said first operative interconnection a speed control adjustment for said perforator units in response to the position of such web reference marks with respect to a preselected norm as determined by said photoelectric means, photoelectric means positioned near said tube cutter means constructed and arranged for scanning said web periodically in response to the speed of said tube cutter means, and power means for introducing in said second operative interconnection a speed control adjustment for said tube cutter means in response to the position of said web reference marks with respect to a preselected norm position as determined by said last-mentioned photoelectric means.

9. A speed compensator unit for a multi-ply paper bag tube forming machine having perforator means for such multi-plies, a tube former, draw rolls and tube cutter, said draw rolls pulling a plurality of paper webs through said tube former, each web forming a ply of the bag tube, one of said webs having a series of reference marks thereon at a substantially constant interval, the combination including: main power means for driving said perforator means, draw rolls and tube cutter; said draw rolls being driven at a fixed speed ratio with respect to said main power means; means for scanning said web at a preselected norm position close to said perforator means at a frequency responsive to the angular velocity of such perforator means; means for modifying the driving power directed to said perforator means in response to the phase relation of said reference marks with respect to said scanned norm position; means for scanning said web at a preselected norm position close to said tube cutter at a frequency which is responsive to the angular velocity of such tube cutter; and means for modifying the driving power directed to said tube cutter in response to the phase relationship of said reference marks with respect to said last-mentioned scanned norm position whereby the perforations formed by the perforator means are positioned in alignment with the cuts formed by said tube cutter, said aligned perforations and cuts being positioned at a selected distance from their respective reference marks.

10. In a machine for manufacturing multi-ply paper valve bags, the combination including: a plurality of perforator units; a web assembly unit; a tube former unit; draw rolls; and a tube cutter situated in that order; said draw rolls aiding in pulling a plurality of paper webs through said perforator units and tube former, each web forming a ply of the bag tube, one of said webs having a series of reference marks thereon at a substantially constant interval appropriate to a preprinted impression upon such marked web; main drive power means; manually adjustable variable speed control means drivably connected to said main drive power means; a pair of main differential means, one for said perforator units as a group and another for said tube cutter, each of said differential means having a primary and a secondary input, each of the primary inputs of said differential means being directly connected to said main drive power means through the intermediary of a set of change gears substantially appropriate to the aforementioned impression length, the secondary input of each of said differential means being drivably connected to said variable speed control means whereby a common adjustment of such latter means will similarly affect both said perforator units as a group and said tube cutter, thereby providing a single adjustment to aid in bringing said perforator units and tube cutter at least temporarily in phase with said impression and marks; means for adjusting one of the inputs of said main differential means of said perforator units in response to the phase relation of said reference marks with respect to the perforations made by at least one of said perforator units; and means for adjusting one of the inputs to the main differential means of said tube cutter in response to the phase relation of said reference marks with respect to the cuts made by said tube cutter.

11. Speed adjusting means for a multi-ply paper bag tube forming machine, the latter including a plurality of rotary perforator units, a tube former, draw rolls and a rotary tube cutter, said draw rolls being positioned between said tube cutter and tube former for pulling a plurality of paper webs through such tube former, each web forming a ply of the bag tube, one of said webs having a series of reference marks marked thereon at a substantially constant interval corresponding to the interval of an impression upon such web which has been preprinted thereupon, the combination including: a pair of main differential means respectively connected to said rotary perforator units as a group and to said tube cutter; main power drive means; a single variable speed control device drivably connected to said main power drive means and deriving its input torque therefrom; means for operatively interconnecting said main power drive means to one input of each of said main differential means through the intermediary of change gear means substantially appropriate to such impression interval; means for operatively interconnecting said variable speed control device to the other of the inputs of each of said main differential means whereby each of such main differential means drives its respective perforator unit and tube cutter under the influence of such two inputs, a common speed adjustment upon said variable speed control device being applicable to both said perforator units as a group and said tube cutter; a reversible electric motor drivably connected to one of the inputs of the main differential for said perforator units; means for actuating said reversible motor in response to the phase relation of said reference marks with respect to the perforations made by at least one of said perforating units; a second reversible electrical motor operatively connected to one of the inputs of such main differential for said tube cutter; means for actuating the latter motor in response to the phase relation of said reference marks with respect to the cuts made by said tube cutter, said main drive means driving said draw rolls at a velocity bearing a fixed ratio to the velocity of such drive means.

12. In a machine for manufacturing multiply paper valve bags, including in combination: a web perforator unit; a multiply bag tube former situated following said web perforator unit; draw roll means for pulling a plurality of paper webs through said perforator unit and tube former, each web forming a ply of the bag tube; one of such webs having a series of reference marks thereon at a substantially constant interval; a tube cutter situated following said bag tube former, said draw roll means including draw rolls situated between said tube cutter and tube former; primary drive means; an adjustable variable speed control device drivably connected to said primary drive means, said variable speed control device being operatively connected to said perforator unit and tube cutter whereby a common speed adjustment can be introduced to both through the intermediary of a pair of differential means, one for said perforator unit and one for said tube cutter, said primary drive means also being directly operatively connected to each of said differential means, change gear means substantially appropriate to such interval, interposed in such direct operative connection between said drive and differential means; photoelectric means operatively associated with said perforator unit for actuation at a frequency which is responsive to the angular velocity of said perforator unit for scanning said series of reference marks on the marked web at such frequency and at a location close to said perforator unit; auxiliary drive means for said perforator unit under the influence of said photoelectric means for introducing a driving torque to such perforator unit to adjust the angular velocity of the latter unit in response to the position of each of such reference marks with respect to said photoelectric means as it passes the latter; second photoelectric means for scanning said reference marks at a position close to said tube cutter and at a frequency responsive to the angular velocity of such tube cutter; and a second auxiliary drive means under the influence of said second photoelectric means and operatively connected to said tube cutter for introducing a driving torque thereto to adjust the speed thereof in response to the position of each of such reference marks with respect to said second photoelectric means as it passes the latter.

13. In a machine for manufacturing multiply paper valve bags, the combination including: a perforator unit having rotary web perforator means, a tube former unit, draw rolls and a rotary tube cutter element situated in that order; said draw rolls aiding in pulling a plurality of paper webs through said tube former, each web forming a ply of the bag tube, one of said webs having a series of reference marks thereon at a substantially common interval; drive means; said draw rolls being driven by said drive means at a fixed speed ratio with respect thereto; manually adjustable variable speed control means driven by said drive means for introducing a common speed adjustment torque to said perforator unit and tube cutter; a pair of differential means for superimposing the driving torque from said variable speed control means and said drive means for driving respectively said perforator unit and tube cutter; change gear means, substantially appropriate to such interval and interposed in a connection between said drive means and said differential means to bring said perforator and cutter units substantially in phase with said marks; auxiliary drive means including a reversible electric motor operatively connected to said perforator unit; means for actuating said auxiliary drive means in response to the phase relation of said reference marks and said rotary perforator means of said perforator unit; auxiliary drive means for said tube cutter including a reversible electric motor; means for actuating said reversible electric motor in response to the phase relation of said reference marks with respect to said rotary cutter element.

14. In a machine for manufacturing multiply paper valve bags, the combination including: a perforator unit having an angularly shiftable perforator means; a tube former unit; draw rolls and an angularly shiftable tube cutter element situated in that order; said draw rolls aiding in pulling a plurality of paper webs through said tube former, each web forming a ply of the bag tube, one of said webs having a series of reference marks thereon at a substantially common interval; drive means; said draw rolls being driven at a fixed speed ratio with respect to said drive means; manually adjustable variable speed control means driven by said drive means for introducing a common speed adjustment torque to said perforator unit and tube cutter; a pair of means for superimposing the driving torque from said variable speed control means and said drive means for driving respectively said perforator unit and tube cutter; change gear means interposed in a connection between said drive means and torque superimposing means to bring said perforator means and cutter element substantially in phase with said reference marks; auxiliary drive means including a reversible electric motor operatively connected to said perforator unit; means for actuating said auxiliary drive means in response to the phase relation of said reference marks and said perforator means of said perforator unit; auxiliary drive means for said tube cutter including a reversible electric motor; means for actuating said reversible electric motor in response to the phase relation of said reference marks with respect to said cutter element.

15. In a machine for manufacturing multiply paper valve bags: a multi-ply paper bag tube former having draw roll means for pulling a plurality of paper webs therethrough, each web forming a ply of the bag tube and one web having a series of reference marks thereon at a substantially common interval; a plurality of web perforator units situated ahead of said tube former; a tube cutter situated following said tube former and substantially spaced from said web perforator units; a main drive power unit; a manually adjustable variable speed control device drivably connected to said power unit; a first differential means drivably connected to and deriving its two input torques from both said main drive power unit and said variable speed control device, the single output of said differential means being drivably connected to said web perforator units as a group; a second differential means drivably connected to and deriving its two input torques from both said main drive power unit and said variable speed control device, the single output of said second differential means being drivably connected to said tube cutter; change gear means, substantially appropriate to said interval, interposed between said main drive power unit and said differential, said draw roll means including draw rolls situated between said tube former and cutter, said draw rolls being driven at a constant speed ratio with respect to said main drive power unit; photoelectric means operatively connected to at least one of said perforator units for scanning said series of marks on the marked web at a position close to said group of perforator units and at a frequency responsive to the speed of such perforator unit; power means under the influence of said photoelectric means, such power means being drivably connected to said perforator units as a group for introducing a speed correction thereto in response to the position of said outer web reference marks with respect to a norm as determined by said photoelectric means; a second photoelectric means operatively connected to said tube cutter for scanning said series of reference marks at a frequency responsive to the speed of such tube cutter, such scanning occurring at a position close to said tube cutter; and a second power means under the influence of said second photoelectric means and drivably connected to said tube cutter for introducing a speed correction thereto in response to the position of said reference marks with respect to a norm as determined by said second photoelectric means.

16. A speed compensator unit for a multi-web bag tube forming machine, including in combination a plurality of perforator units, one for each web, a tube former, draw rolls and a tube cutter, said perforator units and tube cutter being substantially spaced from one another, one of said webs having a series of reference marks thereon separated by a substantially constant interval, means for driving said perforator units, draw rolls and tube cutter in timed relationship, means for scanning said marked web at a preselected norm position close to said perforator units at a frequency responsive to the angular velocity of one of said perforator units, means for modifying the driving power directed to all of said perforator units by a common correction in response to the phase relation of said reference marks with respect to said scanned norm position whereby said perforations are formed in such webs in aligned positions, means for scanning said web at a preselected norm position close to said tube cutter at a frequency which is responsive to the angular velocity of said tube cutter, and means for modifying the driving power directed to said tube cutter in response to the phase relation of said reference marks with respect to the last-mentioned scanned norm position thereby to align the cut in said tube with the aligned perforations made by said perforator units.

References Cited in the file of this patent

UNITED STATES PATENTS

| | | |
|---|---|---|
| 2,028,145 | Coty | Jan. 21, 1936 |
| 2,078,496 | Jaite | Apr. 27, 1937 |
| 2,091,771 | Smithwick | Aug. 31, 1937 |
| 2,581,801 | Lienart | Jan. 8, 1952 |
| 2,764,339 | Owens | Sept. 25, 1956 |